United States Patent
Sakamoto et al.

(10) Patent No.: US 10,469,013 B2
(45) Date of Patent: Nov. 5, 2019

(54) MOTOR CONTROL DEVICE, AND METHOD FOR CORRECTING TORQUE CONSTANT IN SUCH MOTOR CONTROL DEVICE

(71) Applicant: Panasonic Intellectual Property Management Co., Ltd., Osaka (JP)

(72) Inventors: Mitsuhiro Sakamoto, Osaka (JP); Yasuyuki Yokouchi, Osaka (JP); Daisuke Sonoda, Osaka (JP); Ryuta Sasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/287,601

(22) Filed: Feb. 27, 2019

(65) Prior Publication Data

US 2019/0199257 A1 Jun. 27, 2019

Related U.S. Application Data

(62) Division of application No. 15/325,309, filed as application No. PCT/JP2016/000363 on Jan. 26, 2016, now Pat. No. 10,270,377.

(51) Int. Cl.
*H02P 21/00* (2016.01)
*H02P 27/06* (2006.01)
(Continued)

(52) U.S. Cl.
CPC ............ *H02P 21/0025* (2013.01); *H02P 6/10* (2013.01); *H02P 21/00* (2013.01); *H02P 21/20* (2016.02);
(Continued)

(58) Field of Classification Search
USPC ..................................................... 318/400.02
See application file for complete search history.

(56) References Cited

U.S. PATENT DOCUMENTS

| | | | | |
|---|---|---|---|---|
| 6,316,903 B1 * | 11/2001 | Shamoto | ............. | G05B 19/416 318/625 |
| 7,889,978 B2 | 2/2011 | Ueda et al. | | |

(Continued)

FOREIGN PATENT DOCUMENTS

| | | |
|---|---|---|
| CN | 103972972 A | 8/2014 |
| JP | S58-069497 A | 4/1983 |

(Continued)

OTHER PUBLICATIONS

English Translation of Chinese Search Report dated Feb. 1, 2019 for the related Chinese Patent Application No. 201680002103.9.

(Continued)

*Primary Examiner* — Jorge L Carrasquillo

(57) ABSTRACT

A motor control device at least includes a speed control part for controlling a motor rotation speed. The motor control device includes a torque correction means for suppressing variation in torque constant due to individual differences of motors. In addition, the motor control device corrects the torque constant by using a correction torque coefficient calculated based on an unloaded speed when a fixed voltage is applied. Alternatively, the torque constant is corrected using the correction torque coefficient calculated based on the motor applied voltage when the motor speed is fixed.

4 Claims, 5 Drawing Sheets

(51) Int. Cl.
*H02P 6/08* (2016.01)
*H02P 6/10* (2006.01)
*H02P 23/00* (2016.01)
*H02P 21/20* (2016.01)

(52) U.S. Cl.
CPC ...... *H02P 23/0031* (2013.01); *H02P 2205/05* (2013.01)

(56) References Cited

U.S. PATENT DOCUMENTS

| | | |
|---|---|---|
| 2005/0077853 A1 | 4/2005 | Nagakura |
| 2008/0191655 A1 | 8/2008 | Ueda et al. |
| 2011/0148335 A1 | 6/2011 | Harakawa et al. |
| 2012/0242262 A1 | 9/2012 | Atarashi et al. |
| 2012/0249025 A1 | 10/2012 | Okita et al. |
| 2014/0217974 A1 | 8/2014 | Kim et al. |
| 2015/0249418 A1* | 9/2015 | Uematsu ................ H02P 21/22 318/400.02 |

FOREIGN PATENT DOCUMENTS

| | | |
|---|---|---|
| JP | H11-191990 A | 7/1999 |
| JP | 2001-278085 A | 10/2001 |
| JP | 2005-304155 A | 10/2005 |
| JP | 2006-342454 A | 12/2006 |
| JP | 2008-220155 A | 9/2008 |
| JP | 2010-063343 A | 3/2010 |
| JP | 2010-104219 A | 5/2010 |
| JP | 2010104219 A * | 5/2010 |
| JP | 2010-130853 A | 6/2010 |
| JP | 2012-217298 A | 11/2012 |
| WO | 2010/116769 A1 | 10/2010 |

OTHER PUBLICATIONS

International Search Report of PCT application No. PCT/JP2016/000363 dated Apr. 19, 2016.

The Extended European Search Report dated Jul. 13, 2017 for the related European Patent Application No. 16742977.8.

* cited by examiner

MOTOR CONTROL DEVICE, AND METHOD FOR CORRECTING TORQUE CONSTANT IN SUCH MOTOR CONTROL DEVICE

RELATED APPLICATIONS

This application is a divisional of U.S. application Ser. No. 15/325,309, filed Jan. 10, 2017, which is the U.S. National Phase of International Application No. PCT/JP2016/000363, filed on Jan. 26, 2016, which in turn claims the benefit of Japanese Application No. 2015-013835, filed Jan. 28, 2015, the disclosures of which are incorporated by reference herein.

TECHNICAL FIELD

The present invention relates to motor control devices for controlling a synchronous motor and methods of calculating a correction torque coefficient in the motor control devices.

BACKGROUND ART

In a speed control of a synchronous motor, a conversion coefficient that expresses a relationship between a torque command and actual torque that is actually output from the motor is generally called a torque constant. In general, the torque constant is a fixed value that does not change with speed or current and configures a speed control system. However, the actual torque constant is not always fixed. The torque constant may not be fixed due to an influence of current flowing in the motor and a current control circuit.

PTL1 discloses a conventional method as a technical measure to cope with it. PTL1 has a means to measure actual output torque relative to the torque command by actually driving the motor, and correct the torque command. PTL1 controls the motor using this corrected torque command, so as to keep a fixed torque constant.

However, the above conventional method can correct the torque constant according to motor specifications, but cannot correct an influence of individual differences, such as variation in motor production and variation in characteristic of electronic components in a drive circuit.

CITATION LIST

Patent Literature

PTL1 Japanese Patent Unexamined Publication No. H11-191990

SUMMARY OF THE INVENTION

A motor control device of the present invention includes a speed control part for controlling a motor rotation speed, and a torque correction means for suppressing variation in torque constant due to individual differences of motors. This eliminates influence of torque variation in individual motors and thus achieves high-precision torque control.

DESCRIPTION OF EMBODIMENTS

Exemplary embodiments of the present invention are described below with reference to drawings. The exemplary embodiments described herein are illustrative and not restrictive, and the scope of the present invention is not limited thereto.

First Exemplary Embodiment

Figure 1:
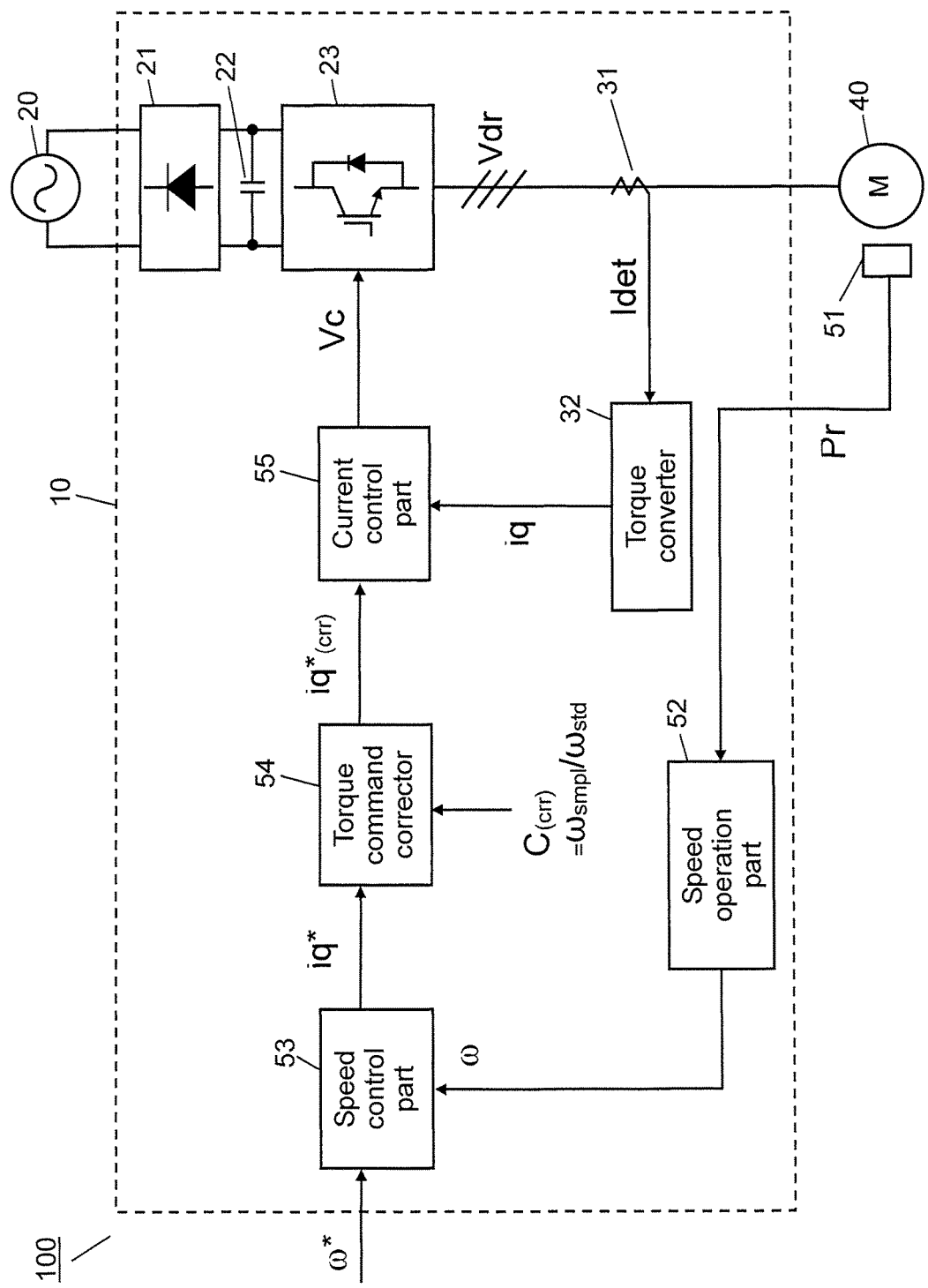
FIG. 1 is a block diagram of a brushless motor equipped with a motor control device in accordance with a first exemplary embodiment of the present invention.

FIG. 1 is a block diagram of brushless motor 100 equipped with motor control device 10 in the first exemplary embodiment of the present invention.

As shown in FIG. 1, brushless motor 100 in the exemplary embodiment includes motor control device 10 and synchronous motor 40. Synchronous motor 40, which is a motor in the exemplary embodiment, rotates by applying current and driving synchronous motor 40 with motor control device 10.

In motor control device 10 shown in FIG. 1, rectifying circuit 21 rectifies AC voltage from AC power source 20 to DC voltage. This is then smoothed by smoothing capacitor 22. Then, the DC voltage is supplied to three-phase inverter 23 in motor control device 10. Three-phase inverter 23 converts supplied DV voltage to required AC voltage. A drive voltage of this AC voltage is supplied to synchronous motor 40 including a permanent magnet. In this way, three-phase synchronous motor 40 having U phase, V phase, and W phase shifted by 120 degrees to each other is driven in the exemplary embodiment.

Figure 2:
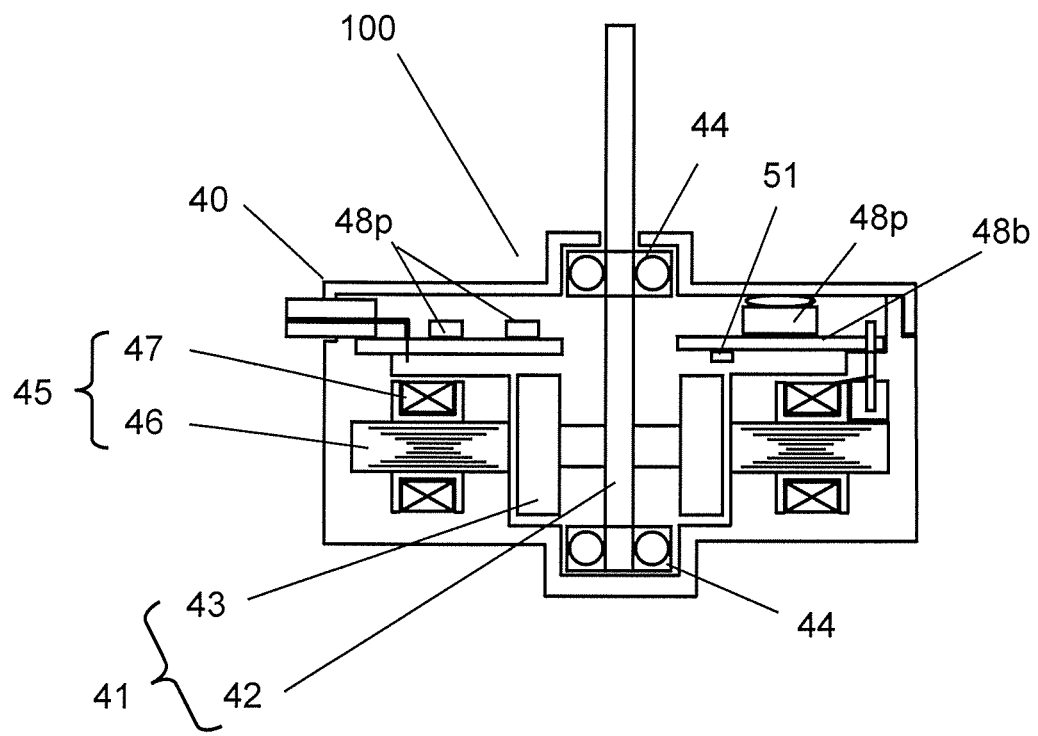
FIG. 2 is an example of structure of a synchronous motor in the brushless motor in accordance with the first exemplary embodiment of the present invention.

FIG. 2 is an example of a structure of synchronous motor 40 in the exemplary embodiment. As shown in FIG. 2, synchronous motor 40 includes rotor 41 and stator 45. Rotor 41 holds permanent magnet 43 centering on shaft 42. Stator 45 is configured by winding motor coil 40 around stator core 46.

In addition, in the exemplary embodiment, brushless motor 100 has built-in circuit components 48p that function as motor control device 10 in synchronous motor 40. These circuit components 48p are mounted on circuit board 48b. For example, a switching element configuring inverter 23 is mounted on circuit board 48b. Still more, position detector 51 for detecting a rotating position of rotor 41 is disposed facing permanent magnet 43 of rotor 41. In this structure, three-phase AC voltage from inverter 23 is applied to motor coil 47 of each phase to energizing and drive motor coils 47, and rotor 41 rotates while being rotatably supported by bearing 44.

In brushless motor 100 as configured above, motor control device 10 includes current detector 31, torque converter 32, speed operation part 52, speed control part 53, torque command corrector 54, and current control part 55 in the exemplary embodiment shown in FIG. 1, in addition to inverter 23 described above, so as to control the rotation of rotor 41. Still more, motor control device 10 receives rotor position information Pr indicating the rotor position from position detector 51. Furthermore, motor control device 10 receives speed command ω* for controlling the rotation speed typically from an external controller, as a command for controlling the rotation of synchronous motor 40.

Next, in motor control device 10 in FIG. 1, speed operation part 52 calculates a motor speed based on rotor position information Pr detected by position detector 51 typically by differential operation. This is informed to speed control part 53 as detected speed ω. Speed control part 53 calculates and outputs torque command iq* that makes deviation between speed command ω* and detected speed ω zero. In other words, the speed control part calculates torque command iq* based on the deviation between speed command ω* and detected speed ω. Torque command corrector 54 corrects the torque command by multiplying torque command iq* output from speed control part 53 by correction torque coefficient $C_{(crr)}$, and sends corrected torque command iq*$_{(crr)}$ obtained to current control part 55. In the exemplary embodiment, torque command corrector 54 is provided to further correct the torque command based on speed deviation, so as to keep a fixed torque constant. In other words, the exemplary embodiment includes this torque command corrector 54 as a torque correction means for making corrections to suppress variation in torque constant due to individual differences of motors.

Current detector 31 detects current flowing when drive voltage Vdr, which is AC drive voltage, is applied to motor coil 47, and outputs it as motor current Idet to torque converter 32. Torque converter 32 performs unit conversion of motor current Idet detected by current detector 31 to torque, and outputs it as detected torque iq to current control part 55. Current control part 55 calculates voltage command Vc such that deviation between torque command iq*$_{(crr)}$ after correction and detected torque iq becomes zero, and outputs it to three-phase inverter 23. In other words, current control part 55 generates voltage command Vc for driving motor coils 47 of synchronous motor 40 based on corrected torque command iq*$_{(crr)}$ and detected motor current Idet. Then, inverter 23 generates drive voltage Vdr based on voltage command Vc, and generated drive voltage Vdr is applied to motor coil 47.

Next, the structure and operation of aforementioned torque command corrector 54 are further detailed.

As is known by a d-q axis in motor vector control, the d axis is an axis in a magnetic flux direction of permanent magnet 43 of rotor 41 in brushless motor 100, and the q axis is an axis whose phase is advanced for 90 degrees in the rotating direction from the d axis. When current in the d axis is d-axis current id, current in the q axis is q-axis current iq, d-axis inductance of motor coil 47 is Ld, q-axis inductance is Lq, induced voltage constant of synchronous motor is Ke, and the number of pole pairs is Pn; torque T of brushless motor 100 is expressed with Formula 1 below.

Formula 1

$$T = P_n \{K_e i_q + (L_d - L_q) i_d i_q\} \quad (1)$$

One of the most popular control methods that have been employed in brushless motors is the id=0 control to keep the d-axis current at 0. In this case, a current vector moves on the q axis according to the load state. It is apparent from Formula 1 that reluctance torque Tr=0 when d-axis current id=0. Generated torque thus becomes only magnet torque Tm. In this case, Formula 1 is transformed to Formula 2 below. It is apparent from Formula 2 that the torque is proportional only to q-axis current iq. Accordingly, linear control of torque becomes easy.

Formula 2

$$T_m = P_n K_e i_q \quad (2)$$

Figure 3:
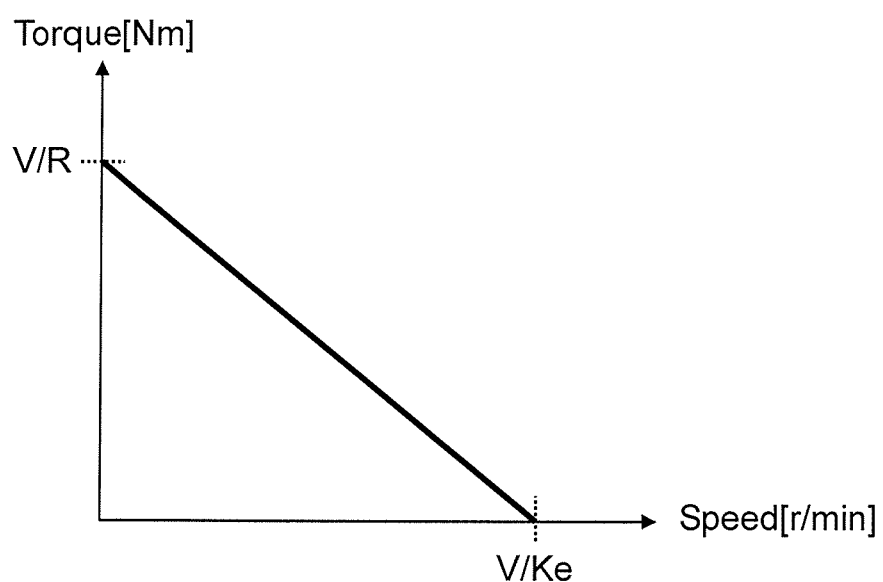
FIG. 3 illustrates a relationship between speed and torque of the brushless motor.

FIG. 3 shows relationship of speed and torque of brushless motor 100. When applied voltage V is applied to motor coil 47 of brushless motor 100, motor speed $\omega_o$ in the unloaded state is expressed with Formula 3 below.

Formula 3

$$\omega_0 = \frac{V}{K_e} \quad (3)$$

Formula 3 can be transformed to obtain induced voltage constant Ke in Formula 4 below.

Formula 4

$$K_e = \frac{V}{\omega_0} \quad (4)$$

On the other hand, torque $T_{std}$ of a reference motor whose induced voltage constant $K_{std}$ is already known is expressed with Formula 5 below based on Formula 2.

Formula 5

$$T_{std} = P_n K_{std} i_q \quad (5)$$

When torque $T_{smpl}$ and induced voltage constant $K_{smpl}$ of a mass-produced motor are assigned to Formula 5, Formula 6 below is obtained.

Formula 6

$$T_{std} = P_n K_{smpl} i_q \frac{K_{std}}{K_{smpl}} \quad (6)$$

$$= T_{smpl} \frac{K_{std}}{K_{smpl}}$$

Based on Formula 4, when $\omega_{std}$ is unloaded speed on applying voltage Va to the reference motor, induced voltage constant $K_{std}$ is expressed with Formula 7 below.

Formula 7

$$K_{std} = \frac{V_a}{\omega_{std}} \quad (7)$$

When $\omega_{smp1}$ is unloaded speed on applying voltage Va to a mass-produced motor under the same conditions, induced voltage constant $K_{smp1}$ is expressed with Formula 8 below.

Formula 8

$$K_{smpl} = \frac{V_a}{\omega_{smpl}} \quad (8)$$

Following Formula 9 is obtained by assigning Formulae 7 and 8 to Formula 6.

Formula 9

$$T_{std} = T_{smpl} \frac{\omega_{smpl}}{\omega_{std}} \quad (9)$$
$$= P_n K_{smpl} i_q \frac{\omega_{smpl}}{\omega_{std}}$$

It is apparent from the above that a torque value same as that of the reference motor is obtained by multiplying q-axis current iq by $\omega_{smpl}/\omega_{std}$ in the mass-produced motor. Here, correction torque coefficient $C_{(crr)}$ of torque command corrector 54 is this $\omega_{smpl}/\omega_{std}$, which is a ratio between unloaded speed $\omega_{smpl}$ of the mass-produced motor and unloaded speed $\omega_{std}$ of the reference motor.

Figure 4A:
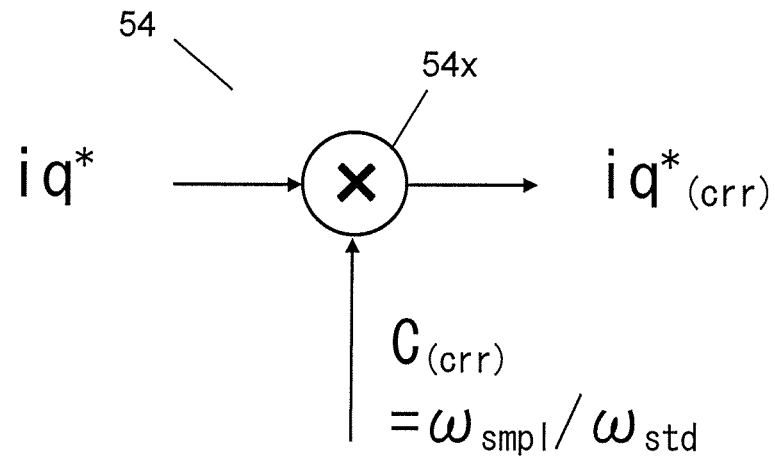
FIG. 4A is an example of a configuration of a torque command corrector in the brushless motor in accordance with the first exemplary embodiment of the present invention.

FIG. 4A is an example of a configuration of torque command corrector 54 executing the above correction. As shown in FIG. 4A, torque command corrector 54 includes multiplier 54x, and multiplies input torque command iq* by correction torque coefficient $C_{(crr)}=\omega_{smpl}/\omega_{std}$ to output a multiplication result as corrected torque command iq*$_{(crr)}$.

As described above, torque command corrector 54 is provided as a torque correction means in the exemplary embodiment to correct torque command iq* output from speed controller 53, using correction torque coefficient $C_{(crr)}$. This correction of torque command (q-axis current command) eliminates torque variation due to individual differences of motors and enables to keep a fixed torque constant.

More specifically, the maximum speed in the unloaded state is measured in advance by applying a predetermined voltage to a motor coil of the reference motor with known torque constant as a standard motor. Then, the maximum speed in the unloaded state of all motors is measured under the same conditions in a mass production process. Correction torque coefficient $C_{(crr)}$ for correcting torque is then calculated based on that speed and the speed of the standard motor, i.e., $\omega_{smpl}/\omega_{std}$, which is a ratio between unloaded speed $\omega_{std}$ on applying a predetermined voltage to the motor coil of the standard motor in the unloaded state and unloaded speed $\omega_{smpl}$ on applying predetermined voltage to motor coil 47 of synchronous motor 40 in the unloaded state. Torque command iq* is multiplied by correction torque coefficient $C_{(crr)}$ to correct the torque constant. This method for correcting torque constant in the exemplary embodiment can improve variation in motor torque. As for specific example, correction torque coefficient $C_{(crr)}$ based on the maximum unloaded speed measured in the mass production process may be stored in a storage part, such as a memory, for correction by torque command corrector 54.

The above description refers to a correction method using correction torque coefficient $C_{(crr)}$ based on unloaded speed when an applied voltage to the motor coil is fixed to be constant. However, correction torque coefficient $Cv_{(crr)}$ based on an applied voltage value when the motor speed is fixed to be constant may be used for correction as the torque correction means.

In this case, correction torque coefficient $Cv_{(crr)}$ is calculated as follows.

From Formula 4, induced voltage constant $K_{std}$ is expressed with Formula 10 below on applying voltage $V_{std}$ to rotate the reference motor at predetermined speed $\omega_a$.

Formula 10

$$K_{std} = \frac{V_{std}}{\omega_a} \quad (10)$$

On applying voltage $V_{smpl}$ to rotate the mass-produced motor at predetermined speed $\omega_a$ under the same conditions, induced voltage constant $K_{smpl}$ is expressed with Formula 11 below.

Formula 11

$$K_{std} = \frac{V_{smpl}}{\omega_a} \quad (11)$$

By assigning Formulae 10 and 11 to Formula 6, Formula 12 below is obtained.

Formula 12

$$T_{std} = T_{smpl} \frac{V_{std}}{V_{smpl}} \quad (12)$$
$$= P_n K_{smpl} i_q \frac{V_{std}}{V_{smpl}}$$

As described above, torque variation due to individual differences of motors can be corrected by multiplying torque command (q-axis current command) iq* of the mass-produced motor by correction torque coefficient $Cv_{(crr)}$, which is $V_{std}/V_{smpl}$. In other words, correction torque coefficient $Cv_{(crr)}$ may be $V_{std}/V_{smpl}$, which is a ratio between voltage $V_{std}$ applied to the motor coil when the reference motor with known torque constant is rotated at a predetermined speed and voltage $V_{smpl}$ applied to motor coil 47 when each brushless motor 100 is rotated at the same predetermined speed in the unloaded state.

Figure 4B:
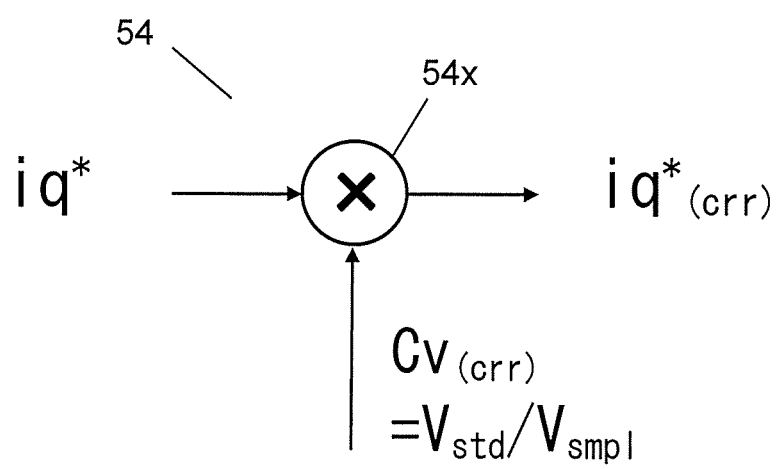
FIG. 4B is an example of another configuration of the torque command corrector in the brushless motor in accordance with the first exemplary embodiment of the present invention.

FIG. 4B shows a configuration of torque command corrector 54 when the above correction is executed. As shown in FIG. 4B, torque command corrector 54 includes multiplier 54x and multiplies input torque command iq* by correction torque coefficient $Cv_{(crr)}=V_{std}/V_{smpl}$ to output a multiplication result as corrected torque command iq*$_{(crr)}$.

In the exemplary embodiment, corrected torque command iq*$_{(crr)}$, which is corrected torque, is used only in current control part 55. However, it may be used in other controller or arithmetic operation.

Second Exemplary Embodiment

Figure 5:
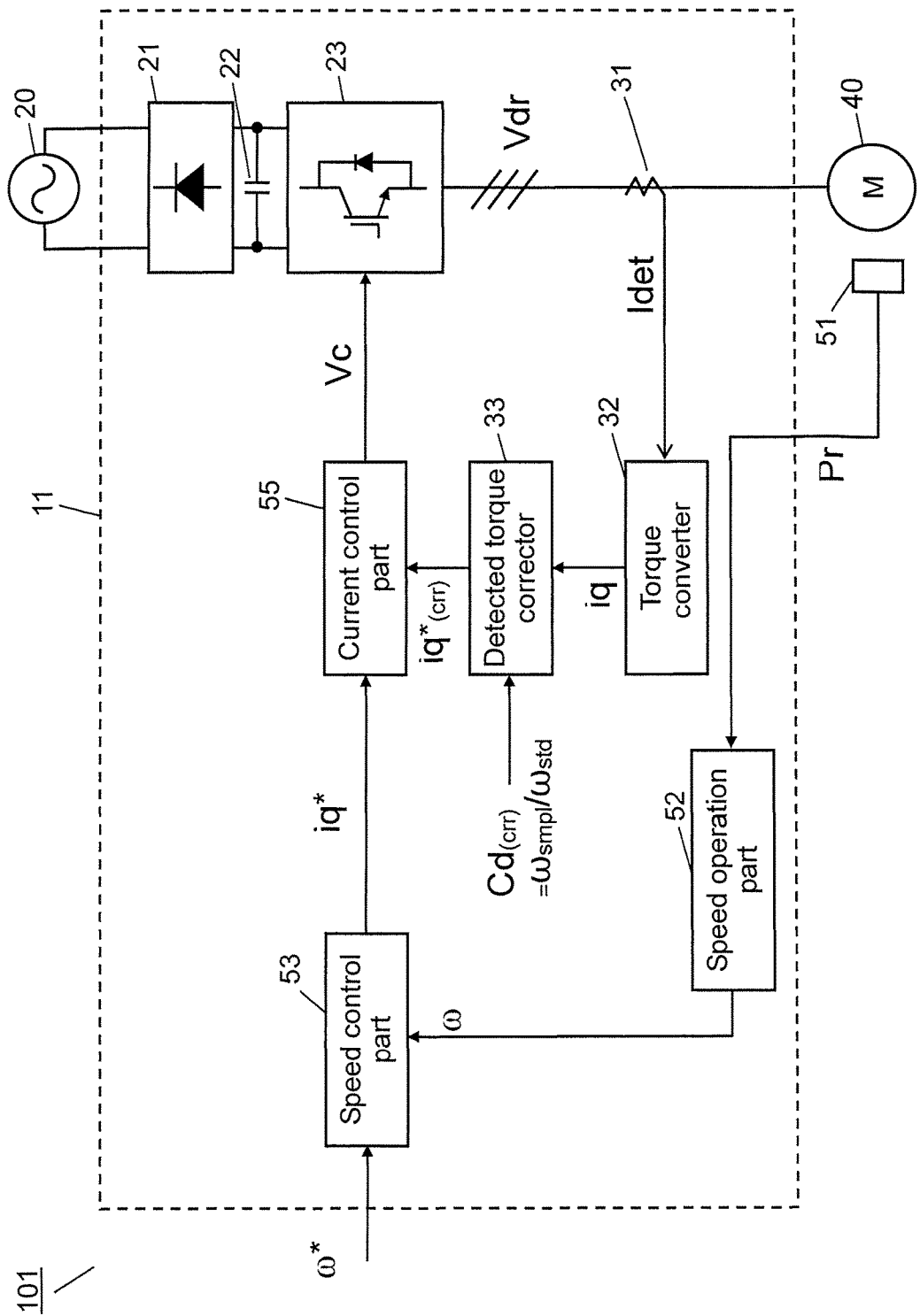
FIG. 5 is a block diagram of a brushless motor equipped with a motor control device in accordance with a second exemplary embodiment of the present invention.

FIG. 5 is a block diagram of brushless motor 101 equipped with motor control device 11 in the second exemplary embodiment of the present invention. Motor control device 11 includes detected torque corrector 33 for correcting detected torque iq in addition to correction of torque command iq*, compared to the first exemplary embodiment in FIG. 1. In FIG. 5, same reference marks are given to components same as those in FIG. 1, and detailed description of these components are omitted.

In FIG. 5, speed operation part 52 calculates a motor speed based on rotor position information Pr detected by position detector 51. This is sent to speed control part 53 as detected speed ω. Speed control part 53 calculates and outputs torque command iq* such that a deviation between speed command ω* and detected speed ω becomes 0.

On the other hand, torque converter 32 performs unit conversion of motor current Idet detected by current detector 31 to torque, and outputs it as detected torque iq. Detected torque corrector 33 corrects detected torque iq, using correction torque coefficient $Cd_{(crr)}$, and sends corrected torque $iq_{(crr)}$ obtained to current control part 55. In the exemplary embodiment, detected torque corrector 33 is provided to further correct the detected torque based on detected motor current Idet, so as to keep a fixed torque constant.

Current control part 55 calculates voltage command Vc that achieves zero deviation between torque command iq* and corrected torque $iq_{(crr)}$, and outputs it to three-phase inverter 23.

Here, with respect to correction by detected torque corrector 33, a torque value same as that of the reference motor is achieved by multiplying detected torque (detected q-axis current) by correction torque coefficient $C_{(crr)}=\omega_{smp1}/\omega_{std}$, as in Formula 9 in the first exemplary embodiment. In the exemplary embodiment, detected torque iq is corrected to eliminate torque variation due to individual differences of motors and keep a fixed torque constant.

In the exemplary embodiment, torque variation due to individual differences of motors can also be corrected by multiplying detected torque (detected q-axis current) by corrected torque coefficient $Cdv_{(crr)}=V_{std}/V_{smp1}$, as in Formula 12 in the first exemplary embodiment.

INDUSTRIAL APPLICABILITY

As described above, the motor control device of the present invention can solve torque variation due to individual differences of motors, and is thus applicable to general motor control devices having a speed control part (including current minor loop), such as of a servo motor.

REFERENCE MARKS IN THE DRAWINGS 10, 11 Motor control device
20 AC power source
21 Rectifying circuit
22 Smoothing capacitor
23 Inverter
31 Current detector
32 Torque converter
33 Detected torque corrector
40 Synchronous motor
41 Rotor
42 Shaft
43 Permanent magnet
44 Bearing
45 Stator
46 Stator core
47 Motor coil
48b Circuit board
48p Circuit component
51 Position detector
52 Speed operation part
53 Speed control part
54 Torque command corrector
54x Multiplier
55 Current control part
100, 101 Brushless motor

The invention claimed is:

1. A motor control device comprising:
a current detector for detecting a motor current flowing through a motor coil of a motor;
a torque convertor for performing a conversion of the motor current to a detected torque of the motor; and
a detected torque corrector for correcting the detected torque output from the torque convertor by using a correction torque coefficient,
wherein the correction torque coefficient is obtained by calculating either one of:
(i) a ratio between an unloaded speed of the motor and a reference unloaded speed of a reference motor, wherein the unloaded speed is a speed of the motor when a predetermined voltage is applied to the motor coil of the motor in an unloaded state where no load is applied to the motor, and the reference unloaded speed is a speed of the reference motor when the predetermined voltage is applied to a motor coil of the reference motor in an unloaded state where no load is applied to the reference motor, and
(ii) a ratio between an applied motor voltage to the motor and a reference voltage to the reference motor, wherein the applied motor voltage is a voltage applied to the motor coil of the motor when the motor is rotated at a predetermined speed in the unloaded state where no load is applied to the motor, and the reference voltage is a voltage applied to the motor coil of the reference motor when the reference motor is rotated at the predetermined speed in the unloaded state where no load is applied to the reference motor.

2. The motor control device of claim 1, wherein the detected torque corrector makes a correction by multiplying the detected torque by the correction torque coefficient and outputs a result of the multiplication as a corrected torque.

3. A method for correcting a detected torque in a motor control device, the method comprising:
detecting a motor current flowing through a motor coil of a motor, the detected torque is converted based on the motor current; and
correcting the detected torque by using a correction torque coefficient,
wherein the correction torque coefficient is obtained by calculating either one of:
(i) a ratio between an unloaded speed of the motor and a reference unloaded speed of a reference motor, wherein the unloaded speed is a speed of the motor when a predetermined voltage is applied to the motor coil of the motor in an unloaded state where no load is applied to the motor, and the reference unloaded speed is a speed of the reference motor when the predetermined voltage is applied to a motor coil of the reference motor in an unloaded state where no load is applied to the reference motor, and
(ii) a ratio between an applied motor voltage to the motor and a reference voltage to the reference motor, wherein the applied motor voltage is a voltage applied to the motor coil of the motor when the motor is rotated at a predetermined speed in the unloaded state where no load is applied to the motor, and the reference voltage is a voltage applied to the motor coil of the reference motor when the reference motor is rotated at the predetermined speed in the unloaded state where no load is applied to the reference motor.

4. The method of claim 3, wherein the step of correcting the detected torque includes making a correction by multiplying the detected torque by the correction torque coefficient and outputting a result of the multiplication as a corrected torque.

\* \* \* \* \*